Sept. 18, 1956     M. J. CHARTIER ET AL     2,763,176

CROSS SLIDE TOOL HOLDER

Filed July 9 1953

INVENTORS.
MAURICE J. CHARTIER AND
GLEN B. HUNT
BY

ATTORNEY.

2,763,176
CROSS SLIDE TOOL HOLDER

Maurice J. Chartier, Milford, and Glen B. Hunt, Fairfield, Conn.

Application July 9, 1953, Serial No. 366,925

4 Claims. (Cl. 82—36)

The present invention relates to a cross slide tool holder for automatic screw machines, and has for an object to provide a holder of this character by means of which the circular forming or cutoff tool carried thereby may be accurately and quickly adjusted in relation to the work, so as to obtain precision adjustment transversely of the cross slide, as well as an angular adjustment of the tool.

A further object is to provide a holder in which the angular adjustment of the tool may be carried out without disturbing the transverse setting, and, conversely, the transverse adjustment may be carried out without disturbing the angular adjustment.

A further object is to provide a holder in which the transverse adjustment may be carried out without loosening the connection of the holder to the cross slide, and to this end it is proposed to provide a holder having a base member which may be secured to the cross slide and a tool supporting member transversely adjustable with respect to the base member.

Another object is to provide an improved mounting for the circular forming or cutoff tool by means of which precision adjustment of the tool about its axis may be carried out.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing:

Fig. 1 is a side elevational of the tool holder mounted upon a cross slide, according to the illustrated embodiment of the invention;

Fig. 2 is a front elevation as seen from the cutting face side of the tool;

Fig. 3 is a top plan view;

Fig. 4 is a vertical sectional view taken along the line 4—4 of Fig. 3;

Fig. 5 is a vertical sectional view taken along the line 5—5 of Fig. 3; and

Fig. 6 is a vertical sectional view taken along the line 6—6 of Fig. 3.

Referring to the drawings, the tool holder of the invention comprises a base member 10 of rectangular plan outline at its forward portion, and of semi-circular plan outline at its rearward portion. At the underside of the member 10 there are provided positioning ribs 11—11 disposed in alignment along the transverse diametric line of the base and which are engageable in the narrow neck portion of the T-slot 12 provided in the cross slide 13, the base member being secured to the cross slide by a pair of machine screws 14—14 set in countersunk holes 15 in the base member and screwed into substantially square nut members 16—16 engaged in the wide portion of the T-slot. Upon tightening of the screws the base member is securely fastened to the cross slide, and upon loosening the screws it may be transversely adjusted on the cross slide. Along the diametric line of the base, between the ribs 11—11, there is provided a transversely extending slot opening 17 of inverted T-shape in cross-section to receive for transverse adjustment relatively to the base member the lower substantially square head portion 18 of a vertical bolt member 19 which is threaded at its upper end, as at 20.

A tubular post member 21, having a circular platform base portion 22, is engaged upon the bolt 19 and is supported upon the base member 10, its upper end portion being externally screw threaded, as at 23, and its upper end surface being spaced downwardly from the upper end of the bolt member 19. Upon the exposed threaded portion 20 of the bolt member there is engaged a nut 24 which, upon being tightened down upon the upper end of the tubular post member, draws the head portion 18 at the lower end of the bolt into clamping engagement in the T-slot 17, thus fixing the position of the bolt member and post member with respect to the base member 10.

The bolt member 19 and the post member 21 are adapted to have transverse adjustment upon the base member 10, and for this purpose the platform base portion 22 is provided in its under side with parallel grooves 25—25 disposed at each side of the center bore, and which are slidably engaged with keys 26—26 set in recesses 27—27 in the upper side of the base member 10 in spaced parallel relation at each side of the slot 17. Thus, the bolt and post members are constrained to a transverse sliding adjustment movement transversely of the base member 10, i. e., in the transverse direction of the T-slot 12 of the cross slide 13.

The transverse adjustment of the bolt and post members is brought about by a feed screw 28 engaged in a threaded hole 29 extending through the platform base portion 22 of the post member 21 in parallel relation to the grooves 25. The feed screw is rotatably mounted at its outer end in an upwardly projecting bearing plate 30 secured in a recess 31 in the side wall of the base member 10 by screws 32. The feed screw is provided at the inner side of the plate with a retaining collar 33 secured by a set screw 34 and is provided at the outer side of the plate with a bevelled head 35 having a screw driver receiving slot 36 and provided with calibrations 37 arranged to be read in relation to an index mark 38 on the plate. These calibrations may be suitably marked to indicate fractions of an inch so that by turning the screw an indicated distance, determined by the calibrations, the post may be transversely adjusted such predetermined amount. It is pointed out that such adjustment is made by first loosening the nut 24 so that the head portion 18 of the bolt member 19 is loose in the T-slot 17.

A tool carrying block member 39 is mounted for angular adjustment upon the post member 21, and to this end is provided with a vertical bore 40 engaged by the post member 21 and a circular recess 41 in its lower end concentric to the bore 40 and engaged by the platform base 22. A nut 42 screwed upon the upper threaded end portion 23 of the post member 21 bears upon the upper side of the block member, and upon being tightened, clamps it against turning movement relatively to the post member. The depth of the recess 41 is such that when its horizontal upper wall is firmly clamped against the upper side of the platform base the lower surface of the block member is free of the upper surface of the base member 10, thus allowing the block member to move transversely with the post member during transverse adjustment of the latter.

The tool holder is designed to permit of an angular adjustment of the block member 39 of approximately 90°, and to this end a clearance space 43 is provided at one side of the recess 41, which allows the block member to be turned through substantially 90° in clockwise direction, as seen in Fig. 3, without interference with the plate 30 carrying the feed screw 28, the plate and the feed screw being disposed in one end of the clearance space. The block member conforms in its plan outline substantially to the base member 10, being substantially rectangular at its forward portion and semi-circular at its rearward portion, and is provided at a suitable point upon the semi-circular rearward wall adjacent the base member 10 with an index mark 44 adapted to move in relation to calibrations 45 provided upon the curved rearward wall of the base member, and which calibrations indicate the degree of angular adjustment of the block member.

In order to obtain precise angular adjustment of the block member, the upper side of the platform base 22 is provided with a series of radial slots 46 equally spaced along the 90° range of adjustment, any one of which, depending on the position of adjustment, is brought within the lower end of a vertical cylindrical passage 47 provided in the block member. An eccentric key 48 is engaged in the passage 47 to effect precise rotation of the block member, this key being in the form of a cylindrical rod rotatably fitted in the passage 47 and provided at its lower end with an eccentric pin 49 which engages one of the slots 46, turning of the pin in one or the other directions thus causing the block member to be turned. The upper end of the key is provided with a manipulating handle 50 in the form of an angular plate engaged in a slot 51 cut in the upper end of the rod and secured by a pin 52.

A pair of diametrically opposite vertical passages 53—53 is provided in the block member in circumferential line with the fastening screws 14, these passages being normally offset from the screws so that the latter are covered, as seen in Fig. 3, and adapted upon turning of the block member upon the post member 21 to be brought into register with the screws, so that the latter may be tightened or loosened by means of a screw driver engaged through the passages 53.

The circular forming or cutoff tool 54 is mounted in the forward side of the block member 39 upon a bolt 55 engaged through a hole 56 in a forwardly projecting ear 57 provided adjacent one side wall of the block member. The forward face of the block member, extending from the inner side of the ear 57, is concavely recessed as at 58 in concentric relation to the periphery of the tool 54 and extending inwardly from the upper portion of the recess surface 58 there is provided a channel 59 engaged by the shaft 60 of a hook bolt member 61, the shaft 60 extending through a passage 62 in the block member and being screw threaded at its outer end portion, as at 63, and engaged by a nut 64 bearing upon the side wall of the block member, tightening of this nut drawing the hook bolt member 61 against the side of the tool 54 to clamp it tightly against the ear 57.

Interposed between the tool 54 and ear 57 is a segment-shaped adjustment plate 65 provided with a center hole 66 engaged by the bolt 55. This plate is adapted to be fixed with respect to the tool, and for this purpose is provided with a dowel pin 67 which engages a socket 68 in the side of the tool. A radial slot 69 is provided in the plate 65 extending inwardly from its rearward edge, and is engaged by an eccentric adjustment key 70 substantially similar to the key 48, this key being in the form of a cylindrical rod rotatable in a cylindrical passage 71 in the block member, and being provided at its inner end with an eccentrically disposed pin 72 engaged in the slot 69 and at its outer end with a square wrench-engaging portion 73. By loosening the clamp 71, precision adjustment may be imparted to the tool 54 by turning the eccentric key 70, the eccentric pin 72 rotating the plate 65 which in turn rotates the tool.

What is claimed is:

1. In a cross slide tool holder, a base member for attachment to a cross slide, a vertical bolt member connected to said base member for transverse adjustment movement having a screw threaded upper end portion, a tubular post member engaged upon said bolt member having a top surface spaced below the upper end of said bolt member to expose the upper threaded end portion of said bolt member and being externally screw threaded at its upper end portion, means connected to said base member and engaged with said post member for imparting transverse adjustment movement thereto, a tool holding member having a vertical bore engaged upon said post member for angular adjustment movement and having a top surface spaced below the top surface of said post member to expose the upper threaded end portion of said post member, a nut engaged upon the upper threaded end of said bolt member and bearing upon the top surface of said post member to secure said post member relatively to said base member, and a nut engaged upon the upper threaded end of said post member and bearing upon the top surface of said tool holding member to secure said tool holding member relatively to said post member.

2. The invention as defined in claim 1, further characterized in that said post member has a laterally extending platform base at its lower end engaged with the upper side of said base member, and said tool holding member has a laterally extending recess at the lower end of said vertical bore engaged by said platform base with the top wall of said recess bearing upon the upper side of said platform base.

3. The invention as defined in claim 1, further characterized in that said post member has a laterally extending platform base at its lower end engaged with the upper side of said base member, said tool holding member has a laterally extending recess at the lower end of said vertical bore engaged by said platform base with the top wall of said recess bearing upon the upper side of said platform base, said platform base having a plurality of radial slots in its upper surface, and said tool holding member having a vertical cylindrical passage in line with at least one of said slots and adapted upon angular adjustment of said tool holding member to move into line with other of said slots, and a key member rotatably engaged in said passage having an eccentric pin engageable in one of said slots whereby upon turning of said key member said tool holding member is angularly adjusted.

4. The invention as defined in claim 1, further characterized in that said base member has a transversely disposed T-slot, and said bolt member has a head at its lower end engaged in said T-slot for transverse adjustment movement.

References Cited in the file of this patent

UNITED STATES PATENTS

| | | |
|---|---|---|
| 414,788 | Williamson | Nov. 12, 1889 |
| 670,962 | Lodge | Apr. 2, 1901 |
| 903,501 | Prince | Nov. 10, 1908 |
| 928,057 | Karpa | July 13, 1909 |
| 1,075,253 | Green | Oct. 7, 1913 |
| 1,222,178 | Browand | Apr. 10, 1917 |
| 2,170,246 | Kleiner | Aug. 22, 1939 |
| 2,497,059 | Thomas | Feb. 7, 1950 |
| 2,625,068 | Smith | Jan. 13, 1953 |

FOREIGN PATENTS

| | | |
|---|---|---|
| 378,336 | Germany | July 12, 1923 |